Figure 1:
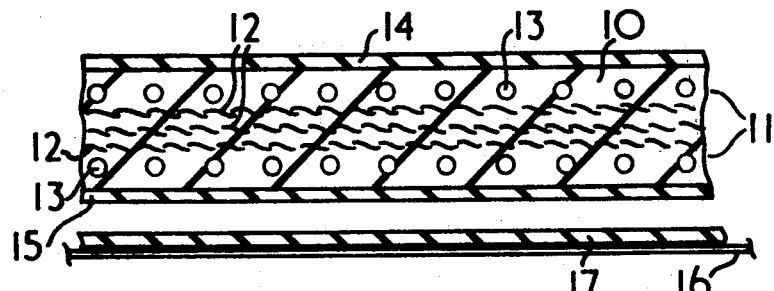

United States Patent

[11] 3,620,357

| [72] | Inventor | Hugh L. Folkes<br>St. Leonard's-on-Sea, England |
|---|---|---|
| [21] | Appl. No. | 879,364 |
| [22] | Filed | Nov. 24, 1969 |
| [45] | Patented | Nov. 16, 1971 |
| [73] | Assignee | Dunlop Holdings Limited<br>London, England |
| [32] | Priority | Dec. 6, 1968 |
| [33] | | Great Britain |
| [31] | | 57,936/68 |

[54] CONVEYORS
4 Claims, 3 Drawing Figs.

[52] U.S. Cl. ..................................................... 198/193
[51] Int. Cl. ....................................................... B65g 15/30
[50] Field of Search ........................................... 198/41,
193; 308/10; 271/63 A

[56] References Cited
UNITED STATES PATENTS

| 3,165,196 | 1/1965 | Alfredeen ..................... | 198/41 |
| 3,179,241 | 4/1965 | Kain ............................. | 198/41 X |
| Re. 26,731 | 12/1969 | Robinson ..................... | 198/193 X |

Primary Examiner—Richard E. Aegerter
Assistant Examiner—Douglas D. Watts
Attorney—Stevens, Davis, Miller & Mosher ABSTRACT: Support system for a conveyor belt, the belt formed of flexible material having a layer of magnetized material on one surface. The magnetized layer cooperates with a support provided with means for forming a magnetic field, such as a further layer of magnetized material, which field repels the belt, of which the following is a specification.

CONVEYORS

This invention relates to belt-type conveyors, and to belts for such conveyors. In particular, but not exclusively, it relates to belt-type passenger conveyors.

In conventional belt-type conveyors, the belt is usually supported by rollers, spaced apart at predetermined intervals. The rollers may extend for the full width of the belt or may be at the edges only as occurs for passenger-conveying belts having transverse rigidity. The belt is in contact with the rollers, and although the rollers are supported on ball or roller bearings, a certain amount of wear of the belt takes place, and also considerable maintenance of the rollers and bearings is necessary.

The present invention provides for the support of a belt by magnetic repulsion.

In accordance with one feature of the invention a belt for a conveyor comprises a flexible polymeric material having a reinforcement embedded therein, and a layer of material having a magnetizable material dispersed therein. In a particular form of belt, the reinforcement embedded in the polymeric material may comprise a tensile element extending in the longitudinal direction of the belt, and at least two spaced layers of parallel metal cords with the cords extending substantially at right angles to the length of the belt.

Figure 2:
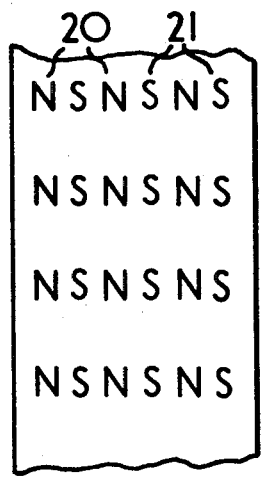
Figure 3:
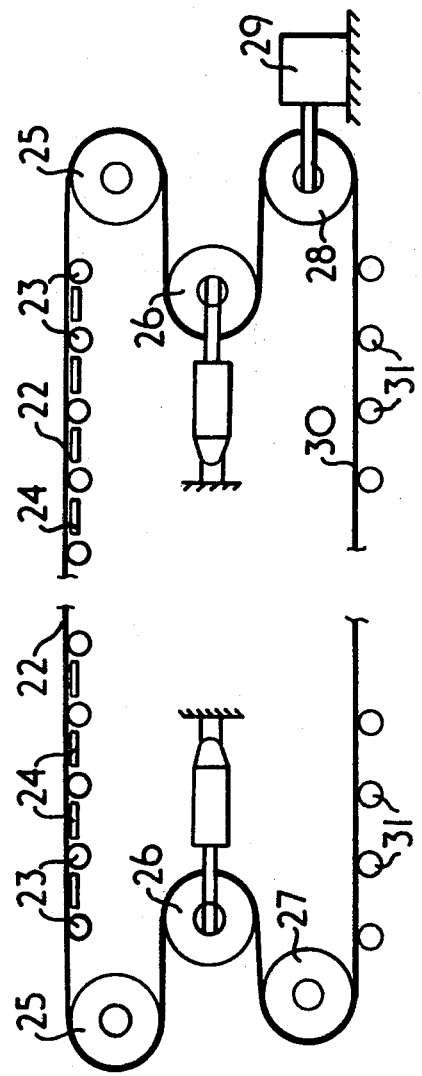

In accordance with another feature of the invention, a conveyor comprises an endless belt; drive means for the belt; and belt support means positioned adjacent the lower surface of the belt for at least part of at least one flight, or run, of the belt; the belt comprising a flexible polymeric material having a reinforcement embedded therein, and a layer of material having a magnetized material dispersed therein and extending the length of the belt, and the support means including means to produce a magnetic field whereby repulsion of the belt is produced. The invention will be readily understood by the following description of certain embodiments, by way of example, in conjunction with the accompanying drawings, in which:

FIG. 1 is a diagrammatic cross section through one form of belt in accordance with the present invention, and a support means for the belt;

FIG. 2 is a diagrammatic plan view of a surface of a belt illustrating a magnetic pole arrangement, and FIG. 3 is a diagrammatic illustration of a conveyor in accordance with the invention The cross section of a belt as illustrated in FIG. 1 is parallel to the length of the belt. The belt comprises a main layer 10, of natural rubber in which is embedded a reinforcement layer indicated generally at 11. The reinforcement layer 11 comprises three plies of woven cotton, 12, and spaced layers of metal cords 13. The plies 12 act as longitudinal tension elements restricting longitudinal extension of the belt. The metal cord layers 13 are positioned one on each side of the plies 12 and extend transversely of the belt. The metal cord layers are spaced apart sufficiently to provide a beam effect and thereby give transverse rigidity to the belt. Such belts are disclosed and claimed in British Pat. No. 974,131.

On the surface of the belt which is load-supporting surface in use, a rubber covering layer 14 is applied. This layer 14 may be ribbed to cooperate with combs positioned at each end of a conveying flight or run. On the opposite surface of the belt, the surface normally in contact with the support means, a layer 15 is applied, this layer comprising rubber containing a dispersed magnetizable material, for example, barium ferrite.

The support means illustrated in FIG. 1 comprises a rigid support plate 16 to which is applied layer 17 comprising rubber containing a dispersed magnetizable material, for example, barium ferrite.

Magnetization of the layers is such that the polarity of the outer surface of layer 15 is the same as the polarity of the outer surface of layer 17. Thus in position there will be a distributed upward thrust on the belt, which can be utilized to help support loads placed on the belt.

Other magnetic materials can be dispersed in the layers, in addition to barium ferrite, or in place of barium ferrite. Such materials include strontium ferrite and lead ferrite. These materials are compounded with a suitable flexible polymeric material, for example, natural rubber or polyvinyl chloride and then formed into a sheet. The sheet is subjected to a strong magnetic field. If the sheet is of material which requires curing, magnetization may take place before or after curing. Suitable flexible polymeric materials which do not require curing include sulfonated chlorinated polythene.

If desired, special techniques may be adopted in manufacturing the flexible polymeric material containing the dispersed magnetizable material, to provide an anisotropic material in which the magnetizable material is orientated in the polymer in such a manner that the product has a high remanence that otherwise similar but isotropic material in which the magnetizable material has a random orientation.

It is also possible for the magnetizable layer of the support means, layer 17, to be of a differing form. Thus this layer can be substantially rigid, comprising, for example, orientated resin bonded ferrite, or sintered barium ferrite.

Similarly, the layer 15, which described as being flexible, may comprise a series of separate rigid plates or bars.

While the arrangement described above comprises layers 15 and 17 forming magnetized layers in which one side of a layer forms one pole of the magnet and the other side of the layer forms the other pole of the magnet, it is possible to provide other arrangements. For example, instead of the mutually repelling layers extending for the full width of the belt, spaced longitudinally extending strips can be used. Alternatively the layers may be magnetized in particular patterns, typically in multiple longitudinally extending zones. Such an arrangement is illustrated in FIG. 2. The layers containing the magnetizable material have been magnetized so that there are alternating longitudinal zones of North poles 20 and South poles 21. However the arrangement in which the layers are magnetized so as to have one pole on one side of a layer and the other pole on the other side is simple and easy to produce, and is achieved by subjecting a layer to a strong unipolar magnetic flux at right angles to the plane of the layer, that is a substantially linear magnetic field extending at right angles to the plane of each layer.

While it is possible for the support means described to provide the only support for a belt, it is envisaged that rollers may also be used. The rollers may extend the full width of the belt but when the belt is of the type having transverse rigidity, then rollers which engage only with the belt in the region of its side edges can be used.

When rollers are used, in addition to support means as described above, the support means may be arranged in the form of a plurality of individual supports, a support positioned between each adjacent sets of rollers. The supports may then extend the full width of the belt. An alternative arrangement is for the support means to comprise either a plurality of individual supports which extend for less than the belt width, or for a continuous member which again extends for less than the belt width. The support means may only extend for a relatively limited distance wither side of the longitudinal center line of the belt. In all arrangements, the load-carrying capacity of a belt can be increased or alternatively, for a given capacity a belt of lesser strength can be used.

For conveyors where the belts are normally supported by rollers adjacent the edges of the belt, such as in passenger or other conveyors using belts with transverse rigidity, in addition to, or alternatively, to the advantages of increased load-carrying capacity, the belt can be wider as the supports in accordance with the present invention will occasion less deflection of the belt under a given load, than would otherwise occur.

Conventional driving means are employed for the conveyor belt as illustrated in FIG. 3. In this arrangement the load-conveying run 22 is supported by rollers 23 engaging the belt only adjacent its edges, and by supports 24 in accordance with the invention. The belt passes round end rollers 25, tensioning rollers 26, and idler roller 27 and a driving roller 28. The driving roller is driven conventionally by an electric motor 29. The return run 30 is supported by rollers 31. Normally, the rollers 25, 26, 27 and 28 are nonmagnetic.

Instead of being driven by conventional means such as electric motors, the belt can be driven by other means, such as a linear motor.

Although the embodiment described above, and illustrated in FIG. 3, has support members with magnetic layers for the load-carrying run only, such support members can also be used for the return run, with or without rollers.

Having now described my invention—what I claim is:

1. A conveyor comprising an endless belt, drive means for the belt, and support means positioned adjacent the lower surface of belt for at least part of at least one run of the belt; the belt comprising a flexible polymeric material having a reinforcement embedded therein and a layer of material having a magnetizable material dispersed therein and extending the length of the belt; the support means including means to produce a magnetic field whereby repulsion of the belt is produced.

2. A belt as claimed in claim 1, wherein the magnetizable material comprises at least one material selected from the group consisting of barium ferrite, lead ferrite and strontium ferrite.

3. A conveyor as claimed in claim 1, wherein the support means comprises at least one rigid support plate having an upper surface layer of magnetized material to produce the magnetic field to repel the belt.

4. A conveyor as claimed in claim 1 wherein two or more rigid support plates are provided and at least one support roller is provided between adjacent support plates.

* * * * *